United States Patent [19]

Braithwaite

[11] Patent Number: 4,699,026

[45] Date of Patent: Oct. 13, 1987

[54] APPARATUS FOR SHARPENING CHAIN SAW CHAINS

[76] Inventor: Phillip W. Braithwaite, 9 The Lane, Shenstone, Worchestershire, England

[21] Appl. No.: 772,450

[22] Filed: Sep. 4, 1985

[51] Int. Cl.[4] .............................................. B23D 63/16
[52] U.S. Cl. ............................................ 76/40; 76/77
[58] Field of Search ..................... 76/75, 76, 77, 25 A, 76/37, 40

[56] References Cited

U.S. PATENT DOCUMENTS 2,300,648  4/1977  Stier .
3,349,645  10/1967 Silvey .
4,102,223  7/1978  Robinson et al. .
4,370,905  2/1983  Simington .
4,416,169  11/1983 Silvey ................................ 76/25 A

FOREIGN PATENT DOCUMENTS 2261359  6/1974  Fed. Rep. of Germany .
3321243  12/1984 Fed. Rep. of Germany ..... 76/25 A
2300648  10/1976 France .
2347141  4/1977  France .
2521470  8/1983  France ............................... 76/25 A Primary Examiner—Roscoe V. Parker
Attorney, Agent, or Firm—Banner, Birch, McKie & Beckett

[57] ABSTRACT

A chain of a chain saw whose teeth are to be sharpened is mounted in a track (4) of a support table so that it can be indexed to a central cutting station whereupon a ram (12) will be acuated to reduce the width of the track (4) and grip the chain. A cutting device will then be lowered into contact with a tooth on the chain so as to sharpen that tooth. When the ram (12) is moved to the open condition the chain is indexed forward again by rotating a pusher arm (8) about a pin (9) while the pin carried on its own arm is driven in a forward direction. This causes an angled forked plate (10) to engage behind a tooth facing in one direction only (of the two possible directions). As the pusher (8) is moved back again a pin (29) rides up over a latch (30) onto the top face of the cam (31) so that the plate (10) can ride over the top of subsequent teeth carried by the chain.

12 Claims, 9 Drawing Figures

APPARATUS FOR SHARPENING CHAIN SAW CHAINS

This invention is concerned with the problem of sharpening the separate cutting teeth carried by links of a chain used on a chain saw. This can be done by hand using a hand-held tool but such a method is not generally very accurate. Alternatively the chain may be gripped in a vice and successive links can be sharpened using a cutting tool mounted on a jig. The vice has to be released to enable the chain to be moved along as each tooth is positioned for sharpening.

It is an object of this invention to provide apparatus which can carry out the sharpening of the teeth on the chain of a chain saw in an automatic manner.

Accordingly this invention provides apparatus for automatic grinding of cutting teeth on the links of a chain for a chain saw, and incorporating a drive member which controls, in sequence, indexing means for moving the chain to present a new tooth for grinding at a cutting station, gripping means for securing the part of the chain carrying the new tooth at the cutting station, contacting means for causing a cutting device to be pressed into contact with the new tooth to sharpen that tooth, and release means for withdrawing the cutting device and releasing the gripping means preparatory to carrying out a new sequence.

When using such an apparatus the operator just has to introduce the chain into the apparatus and then set it in motion whereupon a succession of teeth will be sharpened automatically and rapidly.

In the preferred embodiment the drive member comprises a motor driving cam-operated linkages to the sequentially controlled members. Ideally these linkages to the sequentially controlled members will be adjustable to enable the apparatus to be set up to suit a particular chain saw chain. The linkages could just be cam followers which act directly on the sequentially controlled members but in general it is envisaged that at least some of the linkages will comprise hydraulically, pneumatically or cable controlled operating devices, since some parts, at least, will be positioned remote from the drive member and the associated cams.

The indexing means preferably comprises a pivoting arm which is driven so that a tooth engaging member at an end of the arm engages with the rear of a tooth to be sharpened and drives the chain along a track until the tooth enters the cutting station. Ideally a slipping clutch will be provided at the upstream end of the track, to receive the chain and provide resistance to movement of the chain sufficient to enble the chain to be kept taut during indexing. A particular desirable feature is the provision of a tooth engaging member in the form of a forked plate whose dimensions and angling with respect to the line of the track are such that the gap between the forks can only engage those cutting teeth on the chain which face to one side of the chain. Ideally the forked plate will be adjustably mounted on the end of the pivoting arm so that it can be re-positioned to engage only those teeth on the chain which face to the other side of the chain. It is also desirable to provide that the indexing and gripping means are carried by a table rotatable about an axis at the cutting station to present one or the other of the two sets of teeth carried by a chain at the correct angle for sharpening by the cutting device. Then, when using the apparatus the machine can be set up to sharpen first one set of teeth facing to one side of the chain and then the forked plate and the position of the table can be adjusted, so that when the apparatus is operated again, the teeth facing to the other side of the chain will be sharpened. The parts of the forked plate defining the slot which engages a tooth will be so formed that one of the parts will ride over a tooth facing in the direction other than that for which sharpening is intended so that that particular tooth will not be engaged by the forked plate. It is particularly advantageous to include switch means for initiating each sequence only if the indexing means is correctly positioned behind a tooth on the chain in an orientation suitable to enable that tooth to be sharpened by the cutting device. Then the machine will stop automatically if a correct tooth is not engaged.

The gripping means may comprise a gripping plate movable by the drive mechanism from the drive member against one side of the chain to press the chain into contact with a wall on the other side of the chain.

The contacting means ideally is an arm carrying the cutting device and arranged to be pivotally driven by the drive mechanism from the drive member so that the cutting device will be pressed into contact with a tooth to be sharpened. The cutting device itself may be provided with an independent drive for rotating a disc-type cutter or reciprocating elongated cutter.

Whilst the release means could be a further integer, a simpler construction is to provide that the release means comprises parts of the drive member which are effective to cause the cutting device and the gripping means to be retracted along their original paths.

The invention may be performed in various ways and a preferred embodiment thereof will now be described with reference to the accompanying drawings, in which.

Figure 1:
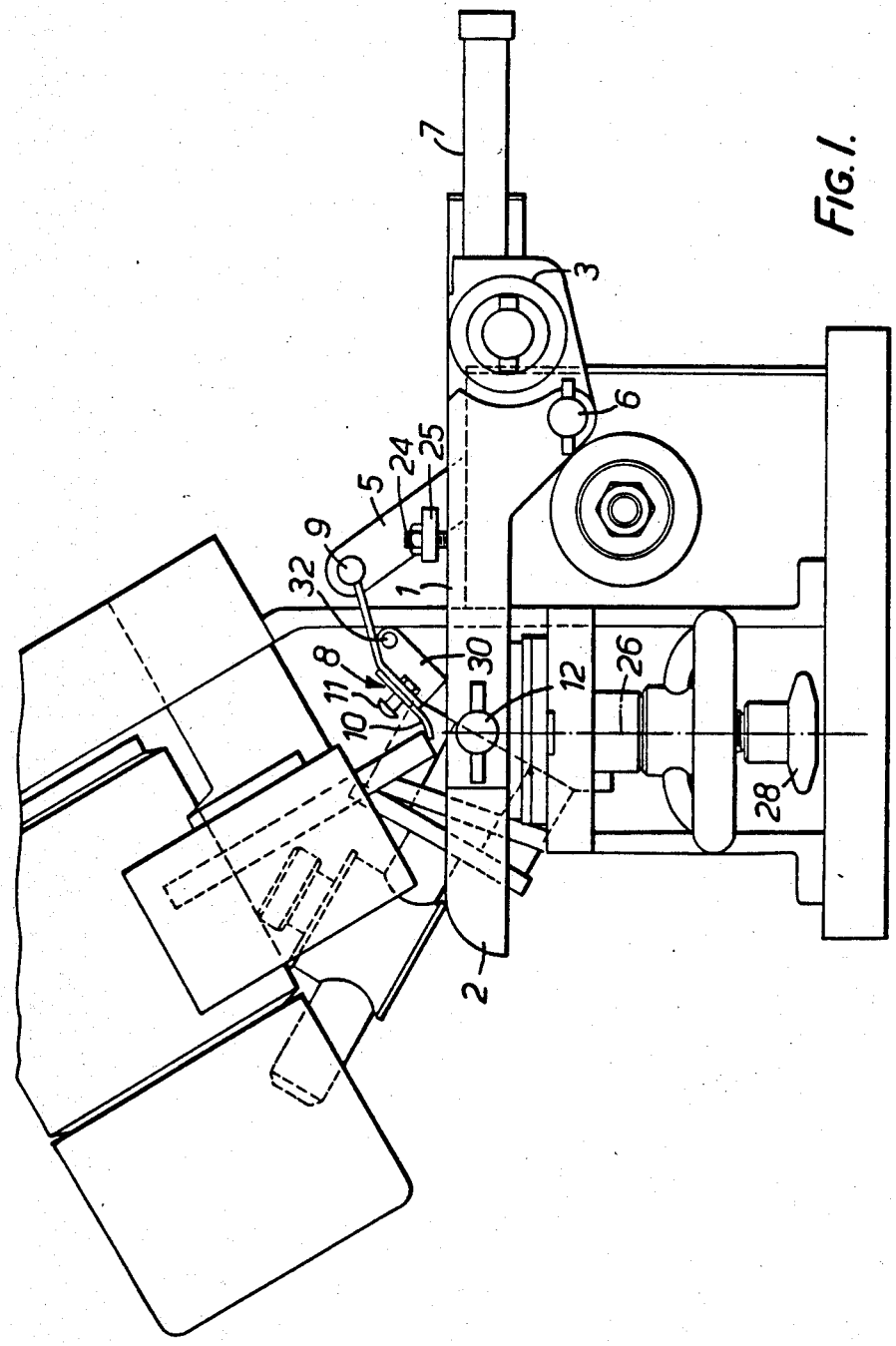
FIG. 1 is a front view of an automatic grinding apparatus of this inventio.
Figure 2:
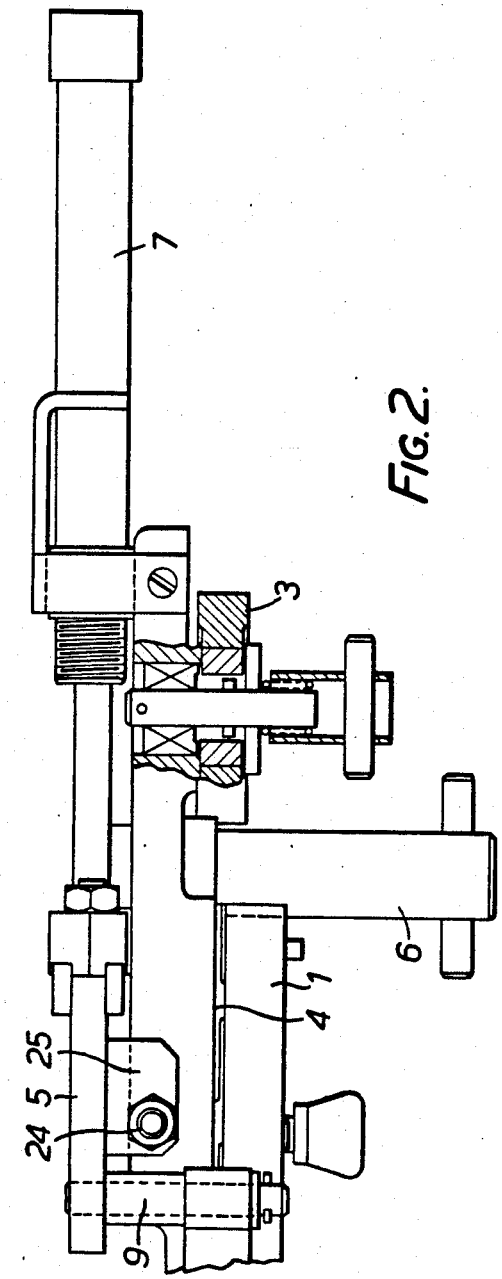
FIGS. 2 and 3 are plan views of parts of the apparatus shown in FIG. 1.
Figure 3:
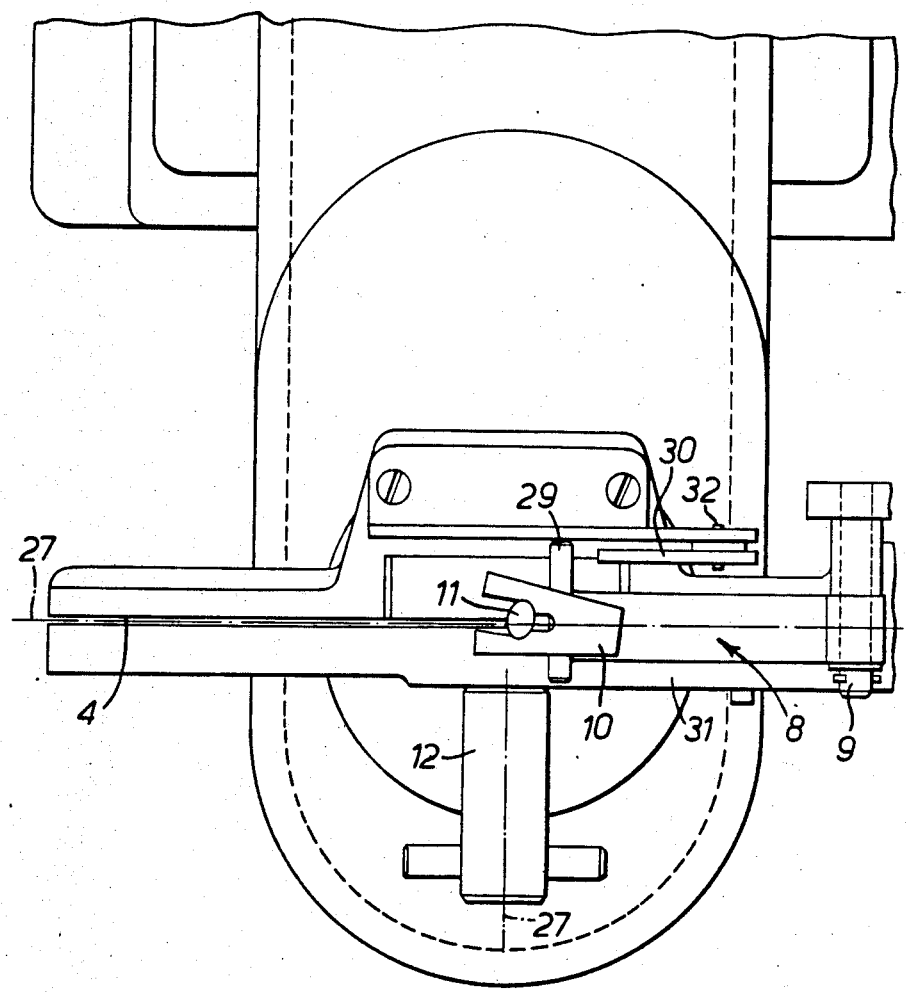
Figure 4:
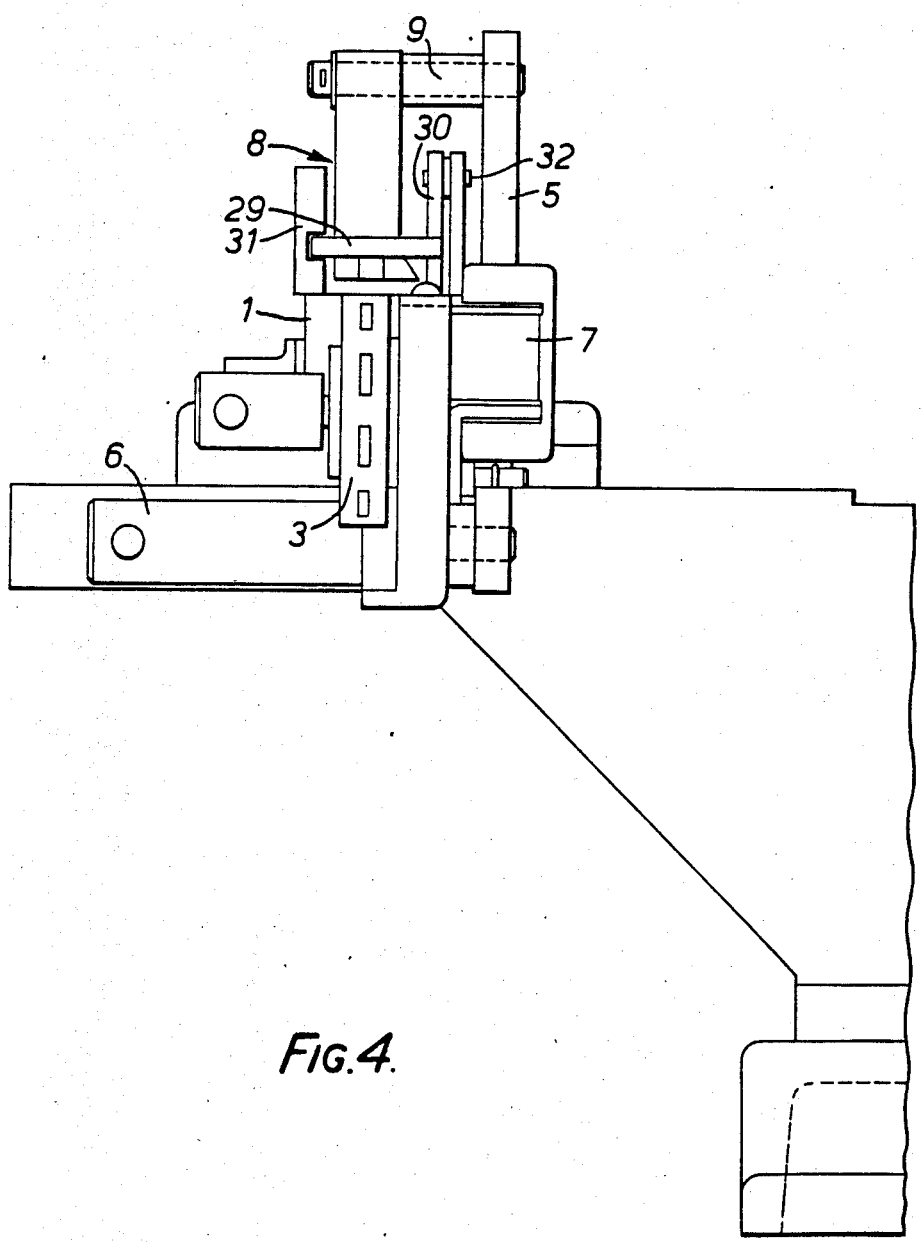
FIG. 4 is an end view of the apparatus shown in FIG. 1.

The apparatus shown in FIGS. 1 to 3 includes a guide table 1 incorporating a groove 4 which receives the links of a chain for a chain saw. The chain will drape over the curved end 2 of the guide table and at the other end will be mounted about a slipping clutch 3. An arm 5 is pivoted at 6 to the body of the apparatus and at a central point is pivotally connected to a ram 7. A pusher 8 is attached by a pin 9 to the arm 5. A forked plate 10 is carried by the pusher 8 by means of an adjusting screw 11. When the ram 7 is operated, the forked plate 10 is driven along the same path as the slot 4 initially in a rearward direction (to the right in FIG. 3). A pin 29 carried by the pusher 8 rides up over a latch 30 and thus onto the top face of a cam plate 31 (shown in FIG. 4 but omitted from FIG. 1). At the rear face of the cam plate 31 the pin 29 can drop down if the forked plate 10 is now able to locate behind a tooth on the chain which faces to the side which is being sharpened. (Otherwise the pin 29 is held in the uppermost position and can only ride forwardly along the top of the cam plate 31 and the latch 30). Forward movement of the pusher 8 by the ram 7 causes the chain to be indexed forwards until the engaged tooth is brought to a cutting station, and during this movement the pin 29 moves along the lower face of the cam plate 31 and lifts the latch 30, which is pivoted at 32, and rides underneath the latch.

Figure 8:
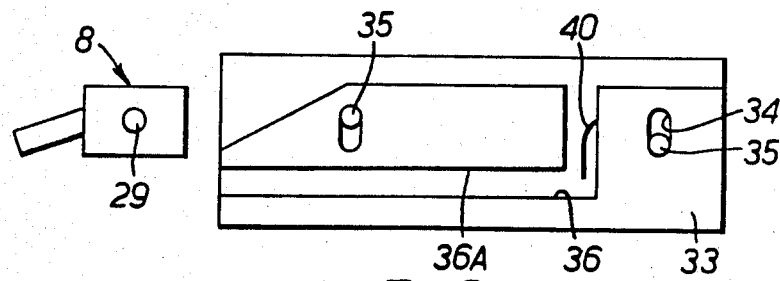
FIG. 8 is a side view of a side plate for directing a latch member of the preferred form of cutting machine of this invention.
Figure 9:
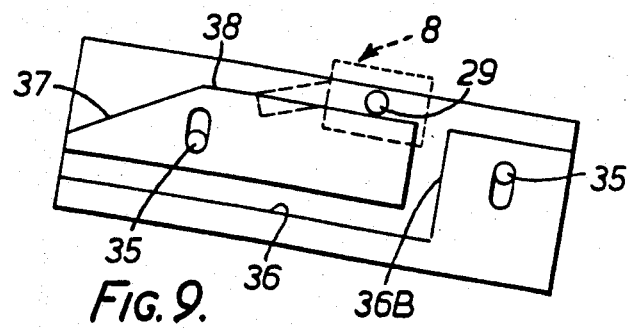
FIG. 9 illustrates the same side plate as in FIG. 8 but in a different attitude corresponding to a new position of the latch.

The cam plate 31 and the latch 30 can be replaced by the side plate 33 shown in the accompanying FIGS. 8 and 9. This plate 33 is mounted by elongated slots 34 on pins 35 and will adopt two alternative attitudes depending upon the position in the sequence of movement of the pusher 8. The pin 29 on the pusher 8 is received in an L-shaped slot 36 in the plate 33 and, as the pusher 8 is moved forwards to index a tooth, the pin 29 will move along the horizontal portion 36A of the slot and out beyond the end into the condition shown in FIG. 8. A cam member will then reorientate the side plate 33 on the pins 35 so that when the pusher 8 is returned the pin 29 must ride up the ramp 37 and will then run along the top surface 38 until the pin can drop down into the vertical portion 36B of the slot, where the pusher 8 will fall behind a correctly orientated tooth on the chain. The cam member will then cause the plate 33 to adopt the alternative attitude shown in FIG. 8 of the drawings.

Figure 6:
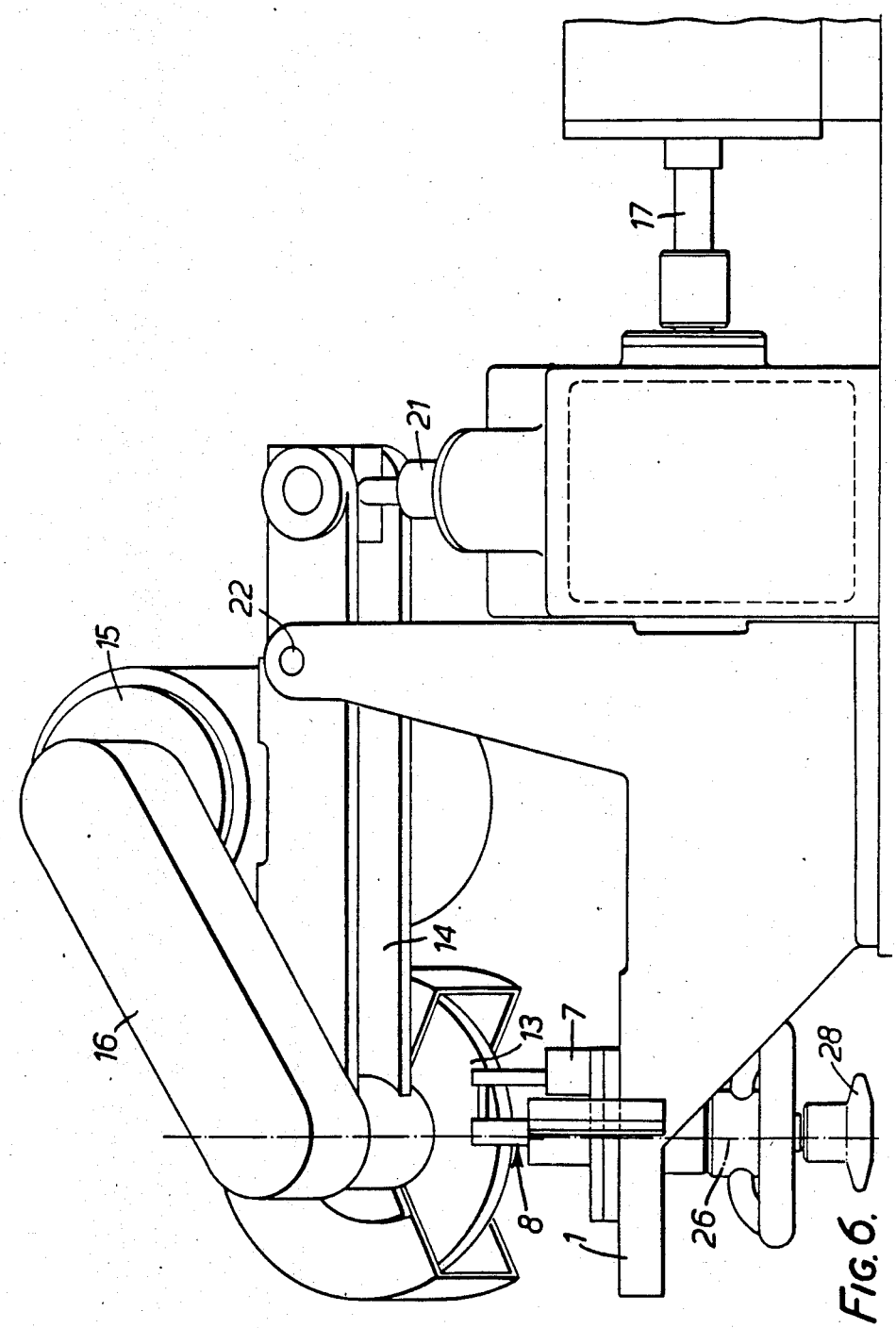
FIG. 6 is another end view of the apparatus in FIG. 1 illustrating details of a cutting device.
Figure 7:
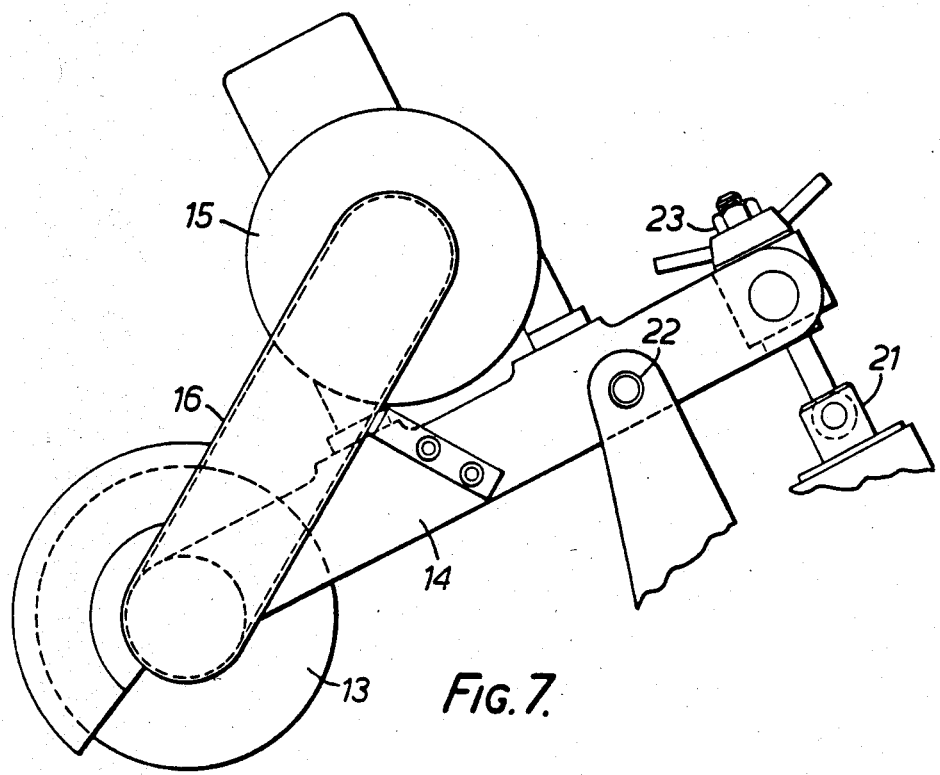
FIG. 7 is a view onto a side of the cutting device shown in FIG. 6.

When a tooth is in place to be sharpened at the cutting station a ram 12 is actuated to cause a plate forming one side of the track 4 in the region of the cutting station to close onto the chain links and grip the chain securely against a fixed plate. After this the cutting disc 13 shown in FIGS. 6 and 7 is lowered on its arm 14 so as to engage the tooth and sharpen its cutting edge. On the arm 14 is mounted a drive motor 15 which drives the cutting disc 13 through a belt drive 16.

Figure 5:
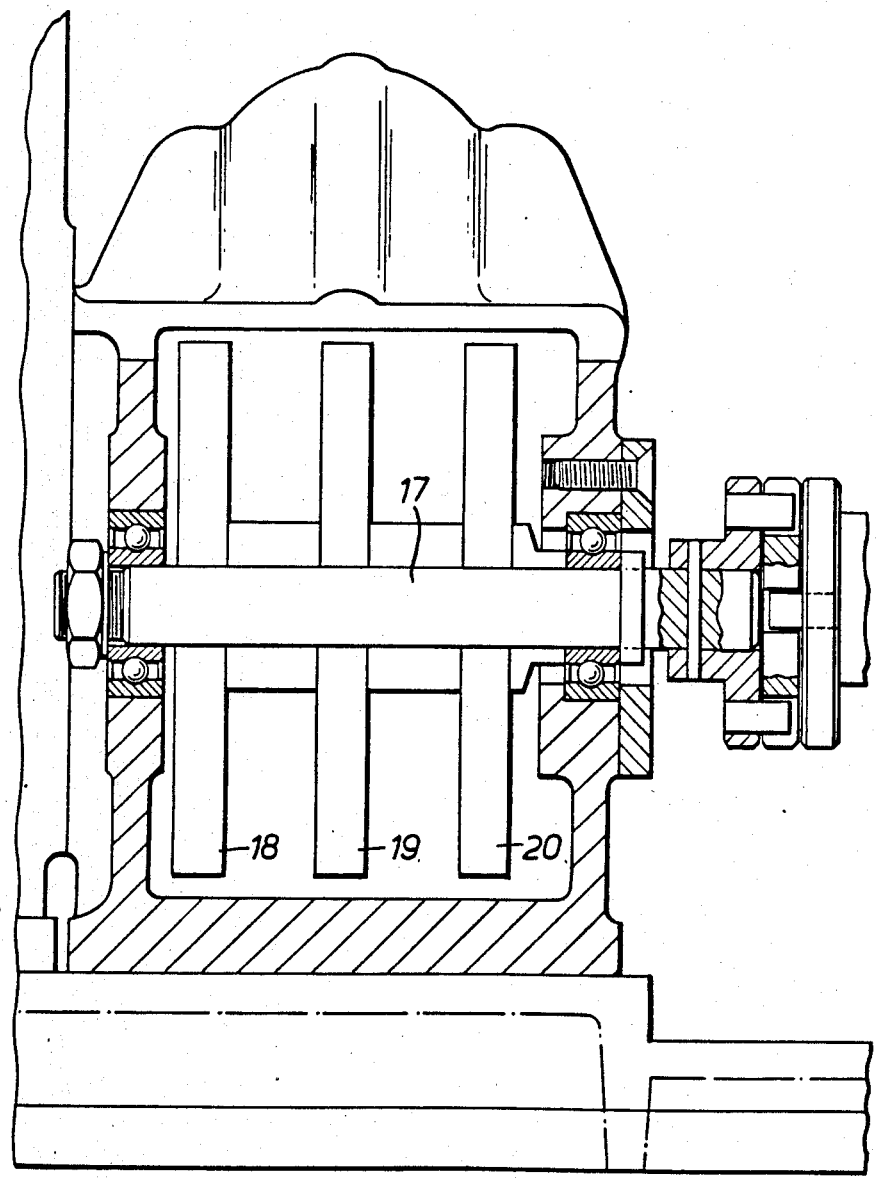
FIG. 5 illustrates a drive mechanism for the apparatus in FIG. 1.

Sequential operation of the rams 7 and 12 and movement of the arm 14 is acheived by means of the drive arrangement shown in FIG. 5. A drive motor (not shown) creates rotation of a shaft 17 carrying 3 cams each shaped so that they actuate, in sequence, 3 cam followers. The cam follower associated with the cam 18 is connected by a hydraulic line to the ram 7 and thus controls actuation of that ram. Similarly the can 19 has a cam follower which is connected by a hydraulic line to the ram 12 to control operation of that ram. The third cam 20 is associated with the cam follower 21 shown in FIGS. 6 and 7 which is pivotally interconnected with one end of the arm 14 which is itself pivotally mounted to the main frame of the apparatus at 22. By means of these cams, in a single sequence, the ram 7 is actuated initially, followed by actuation of the ram 12, so that a tooth on the chain is positioned accurately in place for sharpening, and then the cam follower 21 causes pivoting of the arm 14 so that the cutting disc 13 is pressed into contact with the tooth to sharpen its cutting face.

The depth to which the cutting disc penetrates into the tooth carried by the chain can be adjusted by means of the adjusting mechanism 23 shown in FIG. 7. Also the position of the forked plate 10 carried by the pusher 8 can be modified to vary the distance by which a tooth on the chain is indexed each time, by adjusting a screw 24 (FIGS. 1 and 2) carried by a plate 25 extending from the side of the arm 5. Instead of employing the adjustment device 24, 25 the guide table 1 and the parts carried thereby could be mounted slideably on a support stand. A wheel will then be provided which, when rotated, will cause the guide table to move backwards or forwards thus adjusting the position to which each tooth will be indexed by the pusher 8 with respect to the grinding wheel 13. This allows the cutting position to be varied between chains having different degrees of wear on their teeth.

The attitude of the forked plate 20 can also be changed by rotating it about the axis of the adjustment screw 11 (FIG. 3) so that it will operate only on the teeth which face to the other side of the chain. This adjustment will be carried out when all the teeth facing to one side of the chain have been sharpened. The guide table 1 rotates about the vertical axis 26 (FIG. 1) to positions 45° to either side of the centreline 27 (FIG. 3) depending upon which set of teeth (left hand or right hand) are to be sharpened and is then fixed in place by a hand wheel 28 (FIG. 1). After adjustment about the axis 26, the apparatus will then be set into motion again to sharpen teeth which face to the other side of the chain.

The forked plate 10 is carried automatically over teeth which face in the direction other than that for those teeth for which it is intended to engage by the cam plate 31. If it should be carried over two successive teeth both facing to that other side (occurring in a chain where an extra link has been inserted or one has been removed) then the pusher 8 would just ride back eventually to engage the forked plate 10 behind the tooth which has already been sharpened, because the pin 29 would ride over the top of the cam plate 31. However a microswitch provided for example at 40 in the slot 36B of the plate 33 (FIG. 8) controls the commencement of a new cycle, beginning with indexing of the chain to present a new tooth to the cutting wheel. Alternatively the microswitch could be operated upon depression of a lever when the pusher 8 drops down onto the chain behind a correctly orientated new tooth. If the pusher 8 should fall onto a tooth pointing in the wrong direction then it will be held a little way above its lowermost position and as a result the microswitch 40 will not be closed and a new cycle will not occur. The operator of the machine can then switch it off and adjust the position of the chain so that the next correctly orientated tooth is positioned just ahead of the pusher so that when the machine is switched on again that tooth will be indexed to a position below the cutter wheel. In some instances a chain may incorporate a link which does not carry a tooth and if the pusher falls onto that section of chain, the microswitch will be operated, but the chain will not be indexed forwards as the pusher will not be in contact with a tooth. To prevent this from occurring, the operator of the machine will check a chain before placing it on the machine and if he discovers a link without a tooth on it he will fix a dog onto that link (for example with a grub screw). The dog will be so shaped that when the pusher lands on it, the pusher will be prevented from operating the microswitch 40, so again the machine will stop indexing the chain and the operator will have to readjust it.

Whilst the apparatus has been described as having hydraulic linkages between the cams 18 and 19 and the rams 7 and 12, it will be appreciated that Bowden cables could form the linkages, or with suitable reorganisation of the format of the apparatus direct mechanical linkages could be employed. Hydraulic operation is however most suitable.

I claim:

1. Apparatus for automatic grinding of cutting teeth on the links of a chain for a chain saw with one set of teeth facing one side of the chain and a second set of teeth facing the other side of the chain, and incorporating a drive member which controls in sequence, indexing means for moving the chain to present a new tooth for grinding at a cutting station, gripping means for securing the part of the chain carrying the new tooth at the cutting station, contacting means for causing a cutting device to be pressed into contact with the new tooth to sharpen that tooth, and release means for withdrawing the cutting device and releasing the gripping means preparatory to carrying out a new sequence, said indexing means comprises a pivotal arm which incorporates a tooth engaging member adapted to engage only those cutting teeth on the chain which face to one of the two sides of the chain during any one sequence of operation and for moving the chain to present a new tooth for grinding at said cutting station, adjusting means being provided to present one or other of the two sets of teeth at the correct angle for sharpening, said tooth engaging member being driven so that it engages with the rear of a tooth to be sharpened and drives the chain along a track until the tooth enters said cutting station, and switch means being provided for initiating each sequence only if said tooth engaging member is correctly positioned behind a tooth on the chain in an orientation suitable to enable that tooth to be sharpened by said cutting device.

2. Automatic grinding apparatus according to claim 1, wherein the drive member comprises a motor drivingly associated with cam-operated linkages to the sequentially controlled members.

3. Automatic grinding apparatus according to claim 2, wherein the linkages to the sequentially controlled members are adjustable to enable the apparatus to be set up to suit a particular chain saw chain.

4. Automatic grinding apparatus according to claim 3, wherein at least some of the linkages comprise hydraulically, pneumatically or cable controlled operating devices.

5. Automatic grinding apparatus according to claim 1, wherein a slipping clutch is provided at the upstream end of the track, to receive the chain and provide resistance to movement of the chain sufficient to enable the chain to be kept taut during indexing.

6. Automatic grinding apparatus according to claim 1, wherein the tooth engaging member is a forked plate having a gap between its forks, said tooth engaging member having dimensions and angling with respect to the line of the track such that the gap between the forks can only engage those cutting teeth on the chain which face to one side of the chain.

7. Automatic grinding apparatus according to claim 6, wherein the forked plate is adjustably mounted on the end of the pivoting arm so that it can be repositioned to engage only those teeth on the chain which face to the other side of the chain.

8. Automatic grinding apparatus according to claim 1, wherein the gripping means comprises a gripping plate movable by a drive mechanism of the drive member against one side of the chain to press the chair into contact with a wall on the other side of the chain.

9. Automatic grinding apparatus according to claim 1, wherein the contacting means is an arm carrying the cutting device and arranged to be pivotally driven by a drive mechanism of the drive member so that the cutting device will be pressed into contact with a tooth to be sharpened.

10. Automatic grinding apparatus according to claim 1, wherein the cutting device is provided with an independent drive for rotating or reciprocating a cutter.

11. Automatic grinding apparatus according to claim 1, wherein said chain teeth angle adjusting means comprises a rotatable table and wherein the indexing and gripping means are carried by said table which is rotatable about an axis at the cutting station to present one or the other of the two sets of teeth carried by a chain at the correct angle for sharpening but the cutting device.

12. Automatic grinding apparatus according to claim 1, wherein the release means comprises parts of the drive member which cause the cutting device and the gripping means to be retracted along their original paths.

* * * * *

UNITED STATES PATENT AND TRADEMARK OFFICE
CERTIFICATE OF CORRECTION

PATENT NO. : 4,699,026

DATED : October 13, 1987

INVENTOR(S) : P. W. Braithwaite

It is certified that error appears in the above-identified patent and that said Letters Patent is hereby corrected as shown below:

In Column 3, line 47, "can" should read —cam—.

Signed and Sealed this

Eighth Day of March, 1988

Attest:

DONALD J. QUIGG

*Attesting Officer*  *Commissioner of Patents and Trademarks*